R. E. AND A. D. POULEY.
VALVE GRINDER.
APPLICATION FILED APR. 21, 1919.
1,412,964.
Patented Apr. 18, 1922.
3 SHEETS—SHEET 3.
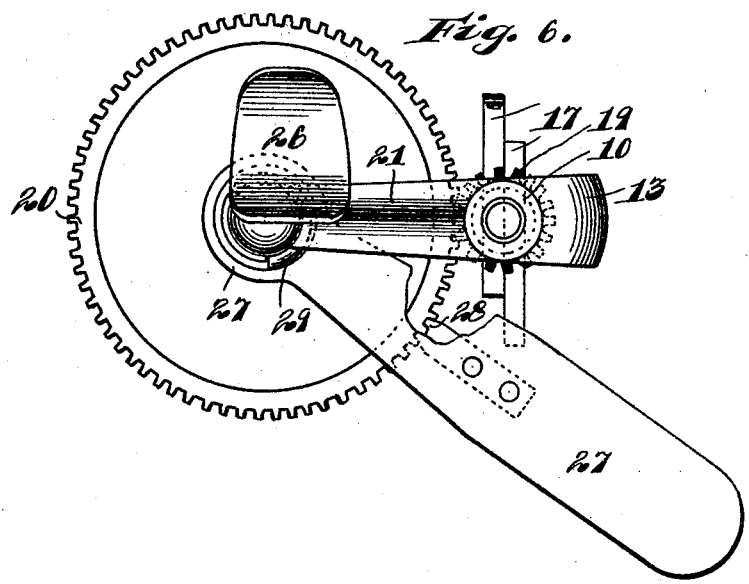
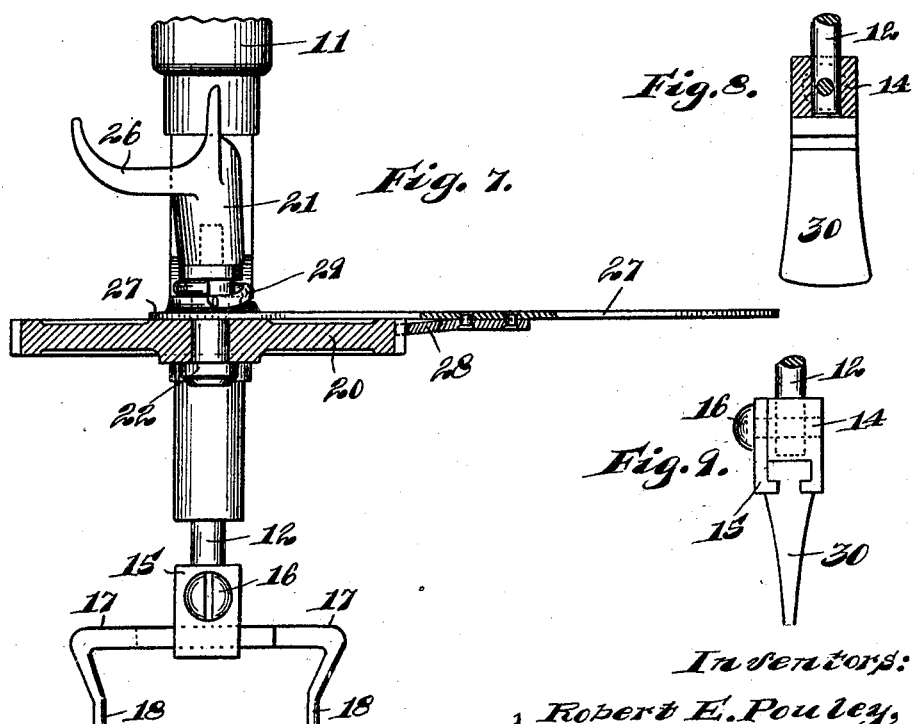
Witnesses:
C. E. Wessels.
B. G. Richards.
Inventors:
Robert E. Pouley,
Arthur D. Pouley,
By Joshua R. H. Potts
Attorney.

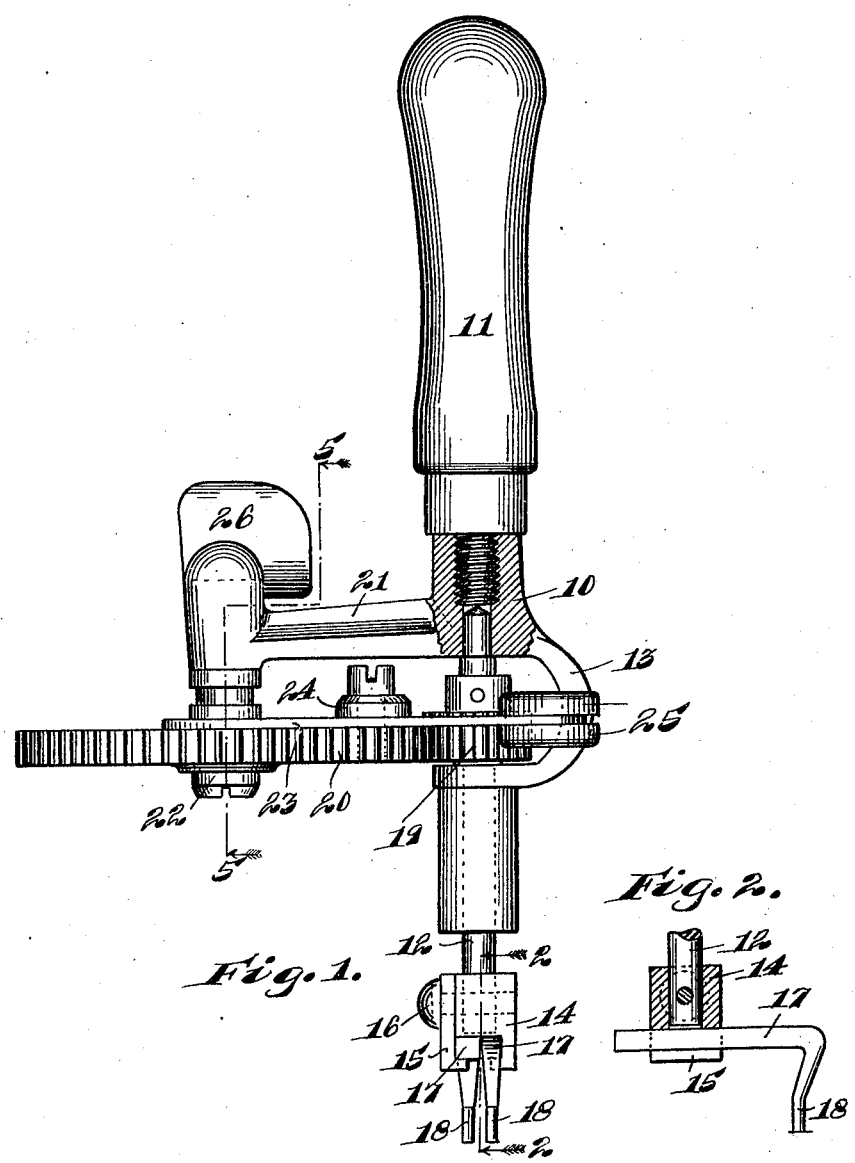

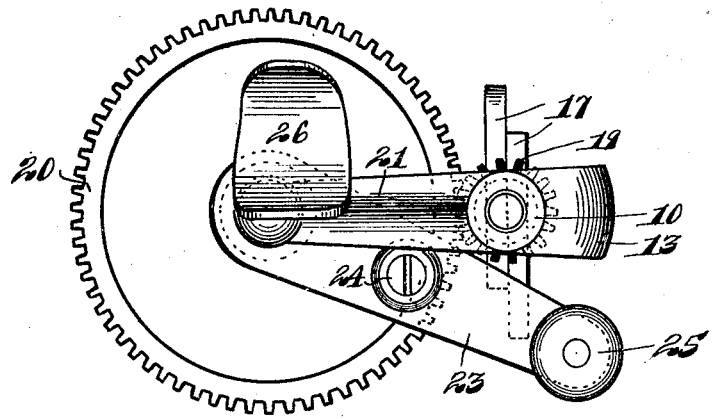
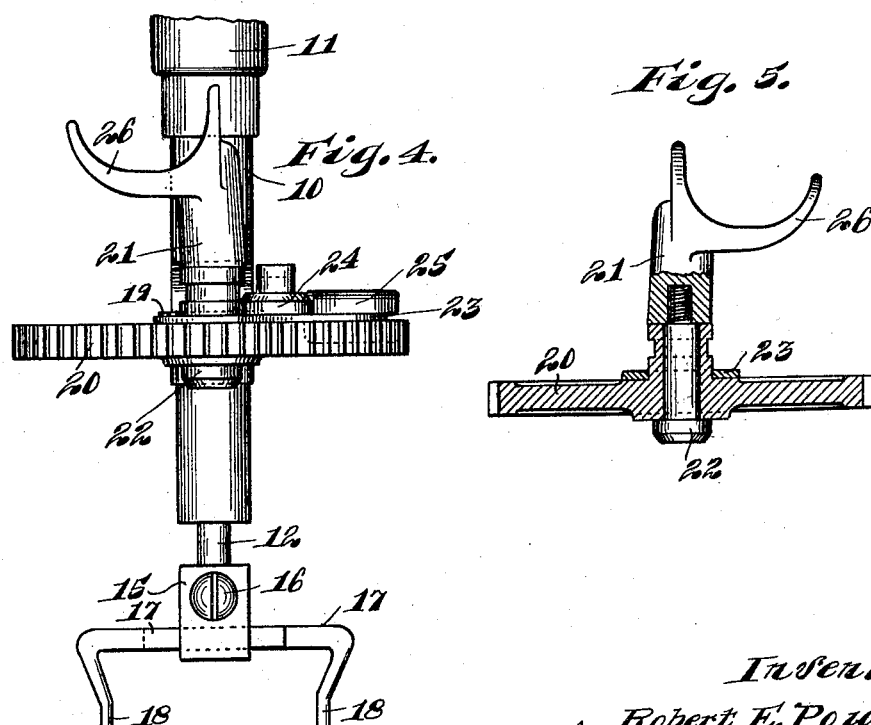

UNITED STATES PATENT OFFICE.

ROBERT E. POULEY, OF CHICAGO, ILLINOIS, AND ARTHUR D. POULEY, OF BAYONNE, NEW JERSEY.

VALVE GRINDER.

1,412,964.   Specification of Letters Patent.   Patented Apr. 18, 1922.

Application filed April 21, 1919. Serial No. 291,669.

*To all whom it may concern:*

Be it known that we, ROBERT E. POULEY and ARTHER D. POULEY, citizens of the United States, and residents of the cities of Chicago, county of Cook, and State of Illinois, and Bayonne, Hudson County, New Jersey, respectively, have invented certain new and useful Improvements in Valve Grinders, of which the following is a specification.

Our invention relates to improvements in valve grinders especially adapted for use in grinding and seating the valves of automobile engines, the object of the invention being to provide a simple and efficient device of this character by means of which such valves may be readily ground and seated.

Other objects will appear hereinafter.

The invention consists in the combinations and arrangements of parts hereinafter described and claimed.

The invention will be best understood by reference to the accompanying drawings forming a part of this specification, and in which, Fig. 1, is a side view, shown partially in section, of a valve grinder embodying the invention, Fig. 2, a section taken on line 2—2 of Fig. 1, Fig. 3, a top plan view of the valve grinder, Fig. 4, a partially side view of the valve grinder taken at right angles to Fig. 1, Fig. 5, a section taken on line 5—5 of Fig. 1, Fig. 6, a top plan view of a slightly modified form of construction, Fig. 7, a vertical section of the construction shown in Fig. 6, and Figs. 8 and 9, detail views of a modified form of valve-engaging means, which is designed to be furnished with the device in addition to that disclosed in the other views of the drawings.

The form of construction illustrated in Figs. 1 to 5, inclusive, comprises a suitable handle member 10 having a handle proper 11 at the upper end thereof, and carrying a rotatable spindle 12 spanning a yoke 13 formed therewith. The spindle 12 is provided at its lower end with a clamping head comprising a clamping block 14 secured to said spindle and a co-operating clamping jaw 15, operable by means of a binding screw 16, as shown. Laterally slidable supporting bars 17 are slidably clamped between the head 14 and the jaw 15 and carry at their outer ends depending spanner wrench prongs 18, adapted to engage the usual spanner wrench holes in the valve of an automobile engine or the like. By this arrangement, it will be observed that the device may be readily adjusted to engage valves having spanner wrench holes formed therein at varying distances apart.

The spindle 12 carries a pinion 19 fixed thereto within the yoke 13 and meshing with a gear 20 mounted at the outer end of a laterally extending arm 21 formed integrally with the handle member 10, said gear 20 being mounted on a stud bolt 22, as indicated. The gear 20 is provided on its upper side with an operating arm or lever 23, loosely engaging over the stud bolt 22 at its inner end and secured to the upper face of gear 20 by means of a cap screw 24, the outer end of lever 23 being provided with finger pieces 25, as shown, to facilitate oscillations of the gear 20 and consequent rotations of the spindle 12 and the valve engaged thereby. At its outer end, bar 21 is provided with a hand or wrist rest 26, in which the butt of the hand or adjacent wrist portion may be placed to apply downward pressure to the device, and also steady the same in operation.

In the modified form of construction illustrated in Figs. 6 and 7, a slightly different form of operating lever for the gear 20 is illustrated. In this arrangement, the operating lever 27 is provided on its under side with a toothed dog 28, engaging the teeth of gear 20 as shown, said arm 27 being normally held in depressed position by means of a split ring spring 29 interposed between the hub of arm 27 and the under side of arm 21. By this arrangement, it will be observed that the position of the arm 27, relatively to the gear 20, may be changed by merely raising said arm and shifting the same angularly with reference to said gear, and then depressing said arm until dog 28 re-engages the teeth of gear 20. By this arrangement the stopping position of the spindle 12 is changed, which likewise changes the stopping position of the valve during the grinding, thus effecting a more perfect grinding and seat thereof.

In Figs. 8 and 9 has been illustrated a different form of valve engaging means from that already described. In this instance, a blade 30, in the form of a screw driver blade is provided, and arranged to be clamped between the head 14 and the jaw 15, and by means of which a valve having a screw driver slot therein may be readily engaged when desired.

In use, the valve is ground or seated by applying abrasive thereto, and then engaging the valve by means of the spanner wrench prongs 18, and the valve oscillated by manipulating the operating handle or lever for gear 20. This operation is greatly facilitated by the co-operation of the hand or wrist rest 26, which serves as a support for the hand of the operator in holding the handle member 10, and this steadies the position thereof and affords a means for applying downward pressure thereto.

While we have illustrated and described the preferred forms of construction for carrying our invention into effect, these are capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:—

1. A valve grinder comprising a handle; a spindle mounted on said handle; valve engaging means on said spindle; a pinion on said spindle; a gear loosely mounted on said handle and meshing with said pinion; an operating lever pivoted co-axially with said gear; and a toothed dog on said lever detachably engaging the teeth of said gear, substantially as described.

2. A valve grinder comprising a handle; a spindle mounted on said handle; valve engaging means on said spindle; a pinion on said spindle; a gear loosely mounted on said handle and meshing with said pinion; an operating lever pivoted co-axially with said gear; a toothed dog on said lever detachably engaging the teeth of said gear; and a spring washer on the pivotal mounting of said lever yieldingly holding said dog in engagement with said gear, substantially as described.

3. A valve grinder comprising a handle; a spindle mounted on said handle; valve engaging means on said handle; a pinion on said spindle; a gear meshing with said pinion; means for operating said gear; a hand rest in operative relation with said handle; and an angularly adjustable operating lever on said gear, substantially as described.

4. A valve grinder comprising a handle; a spindle mounted on said handle; valve engaging means on said spindle; a pinion on said spindle; a laterally extending arm on said handle; a gear rotatably mounted on said arm and meshing with said pinion; a hand rest on said arm; and an angularly adjustable operating lever on said gear, substantially as described.

5. A valve grinder comprising a handle; a spindle mounted on said handle; laterally adjustable spanner wrench prongs on said spindle; a pinion on said spindle; a laterally extending arm on said handle; a gear rotatably mounted on said arm and meshing with said pinion; a hand rest on said arm; and an angularly adjustable operating lever on said gear, substantially as described.

6. A valve grinder comprising a vertically extending handle; a spindle on said handle; a pinion on said spindle; a laterally extending arm on said handle; a gear on said arm meshing with said pinion; and a rest on said arm adapted and arranged to constitute a bearing surface for the wrist of a hand grasping said handle, substantially as described.

In testimony whereof we have signed our names to this specification in the presence of two subscribing witnesses.

ROBERT E. POULEY.
ARTHUR D. POULEY.

Witnesses as to Robert E. Pouley:
  JOSHUA R. H. POTTS,
  B. G. RICHARDS.

Witnesses as to Arthur D. Pouley:
  ELMER W. KERN,
  WILLIAM DAVID EVANS.